(12) United States Patent
Sim et al.

(10) Patent No.: US 11,551,870 B2
(45) Date of Patent: Jan. 10, 2023

(54) MULTILAYER CERAMIC ELECTRONIC COMPONENT

(71) Applicant: SAMSUNG ELECTRO-MECHANICS CO., LTD., Suwon-si (KR)

(72) Inventors: Kyu Jeong Sim, Suwon-si (KR); Ho Sam Choi, Suwon-si (KR); Seung Min Kang, Suwon-si (KR); Jin Kyu Kim, Suwon-si (KR); Jae Won Kim, Suwon-si (KR); So Hyeon Hong, Suwon-si (KR); Jong Ho Lee, Suwon-si (KR); Chung Eun Lee, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 0 days.

(21) Appl. No.: 17/398,524

(22) Filed: Aug. 10, 2021

(65) Prior Publication Data

US 2022/0139624 A1 May 5, 2022

(30) Foreign Application Priority Data

Oct. 29, 2020 (KR) ........................ 10-2020-0142348

(51) Int. Cl.
*H01G 4/12* (2006.01)
*H01G 4/30* (2006.01)
(Continued)

(52) U.S. Cl.
CPC .......... *H01G 4/1227* (2013.01); *H01G 4/008* (2013.01); *H01G 4/232* (2013.01); *H01G 4/248* (2013.01); *H01G 4/30* (2013.01)

(58) Field of Classification Search
None
See application file for complete search history.

(56) References Cited

U.S. PATENT DOCUMENTS

| | | | | |
|---|---|---|---|---|
| 7,433,173 B2 * | 10/2008 | Iwasaki | .................. | C04B 35/49 361/321.5 |
| 9,812,259 B2 * | 11/2017 | Lee | ......................... | H01G 4/30 |

(Continued)

FOREIGN PATENT DOCUMENTS

| | | | | | |
|---|---|---|---|---|---|
| CN | 112837935 A | * | 5/2021 | ........... | H01G 13/006 |
| JP | 2004273975 A | * | 9/2004 | ............ | H01G 4/008 |

(Continued)

*Primary Examiner* — Dion R. Ferguson
(74) *Attorney, Agent, or Firm* — Morgan, Lewis & Bockius LLP

(57) ABSTRACT

A multilayer ceramic electronic component includes: a ceramic body including an active portion having dielectric layers and first and second internal electrodes and first and second cover portions disposed on opposite surfaces of the active portion in a stacking direction, respectively; wherein when a region of the cover portion in contact with the first or second internal electrode is an inner region of the cover portion and a region of the active portion in contact with the inner region of the cover portion is an outer region of the active portion, $1.00 < X_A/X_B \leq 1.04$ in which $X_A/X_B$ is a ratio of a molar ratio ($X_A$) of barium (Ba) to titanium (Ti) in the inner region of the cover portion to a molar ratio ($X_B$) of barium (Ba) to titanium (Ti) in the outer region of the active portion.

14 Claims, 7 Drawing Sheets

(51) Int. Cl.
    *H01G 4/248*     (2006.01)
    *H01G 4/008*     (2006.01)
    *H01G 4/232*     (2006.01)

(56) References Cited

U.S. PATENT DOCUMENTS

| | | | |
|---|---|---|---|
| 9,988,310 B2* | 6/2018 | Yoon | C04B 35/4686 |
| 10,224,148 B2* | 3/2019 | Mizuno | H01G 4/232 |
| 2003/0096125 A1* | 5/2003 | Ogasawara | C01G 25/006 |
| | | | 156/89.12 |
| 2005/0219795 A1 | 10/2005 | Murasawa et al. | |
| 2012/0262840 A1* | 10/2012 | Koizumi | H01G 4/12 |
| | | | 361/321.2 |
| 2014/0301013 A1* | 10/2014 | Kim | H01G 4/01 |
| | | | 29/25.03 |
| 2015/0279564 A1* | 10/2015 | Naito | H01G 4/1227 |
| | | | 361/301.4 |
| 2017/0190626 A1* | 7/2017 | Yoon | H01G 4/1227 |
| 2018/0294104 A1* | 10/2018 | Mizuno | H01G 4/1227 |
| 2020/0185152 A1* | 6/2020 | Uchida | H01G 4/012 |
| 2021/0012968 A1* | 1/2021 | Taniguchi | H01G 4/30 |
| 2022/0139624 A1* | 5/2022 | Sim | H01G 4/232 |
| | | | 361/301.4 |
| 2022/0189698 A1* | 6/2022 | Keum | H01G 4/012 |
| 2022/0208455 A1* | 6/2022 | Nam | H01G 4/30 |

FOREIGN PATENT DOCUMENTS

| | | |
|---|---|---|
| JP | 2005-294317 A | 10/2005 |
| JP | 2006-137633 A | 6/2006 |
| JP | 2019-179928 A | 10/2019 |
| KR | 20130062343 A * | 6/2013 |

* cited by examiner

MULTILAYER CERAMIC ELECTRONIC COMPONENT

CROSS-REFERENCE TO RELATED APPLICATION(S)

This application claims benefit of priority to Korean Patent Application No. 10-2020-0142348 filed on Oct. 29, 2020 in the Korean Intellectual Property Office, the disclosure of which is incorporated herein by reference in its entirety.

BACKGROUND

1. Field

The present disclosure relates to a multilayer ceramic electronic component.

2. Description of Related Art

In accordance with the recent trend for the miniaturization of electronic products, multilayer ceramic electronic components have also been required to be miniaturized and to have high capacitance. In accordance with demand for the miniaturization and implementation of high capacitance in multilayer ceramic electronic components, a dielectric sheet of the multilayer ceramic electronic component has also been thinned.

Meanwhile, it has been known that withstand voltage characteristics of an electronic component are greatly affected by sizes/size dispersion and the like of crystal grains of microstructures in the electronic component. As the dielectric sheet is thinned, sizes or the like of crystal grains of a dielectric layer have been affected, such that withstand voltage and reliability characteristics of a chip have been deteriorated. In general, since grain boundaries between crystal grains of the electronic component have a high resistance component, research into a technology for providing an electronic component having high reliability by increasing a ratio of the grain boundaries in the dielectric layer has been conducted.

However, when sizes of crystal grains per dielectric layer are increased, there is an advantage in realizing capacitance and high resistance, but a dispersion of the sizes of the crystal grains increases, resulting in non-uniformity of the microstructures. Such non-uniformity of the microstructures causes a problem that an electric field is concentrated on a specific portion of the dielectric layer. As a result, there is a problem in that electrical characteristics of the chip such as a withstand voltage and reliability are deteriorated.

SUMMARY

An aspect of the present disclosure may provide a multilayer ceramic electronic component of which sizes and a size dispersion of crystal grains of a component of the dielectric layers may be constantly adjusted.

Another aspect of the present disclosure may provide a multilayer ceramic electronic component of which withstand voltage characteristics may be improved.

Another aspect of the present disclosure may provide a multilayer ceramic electronic component of which insulation resistance characteristics may be improved.

According to an aspect of the present disclosure, a multilayer ceramic electronic component may include: a ceramic body including an active portion having dielectric layers and first and second internal electrodes alternately stacked with each of the dielectric layers interposed therebetween and first and second cover portions disposed on opposite surfaces of the active portion in a stacking direction, respectively; and a first external electrode connected to the first internal electrodes and a second external electrode connected to the second internal electrodes, wherein when a region of the cover portion in contact with the first or second internal electrode is an inner region of the cover portion, and a region of the active portion in contact with the inner region of the cover portion is an outer region of the active portion, $1.00 < X_A/X_B \leq 1.04$ in which $X_A/X_B$ is a ratio of a molar ratio $(X_A)$ of barium (Ba) to titanium (Ti) in the inner region of the cover portion to a molar ratio $(X_B)$ of barium (Ba) to titanium (Ti) in the outer region of the active portion.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Figure 1:
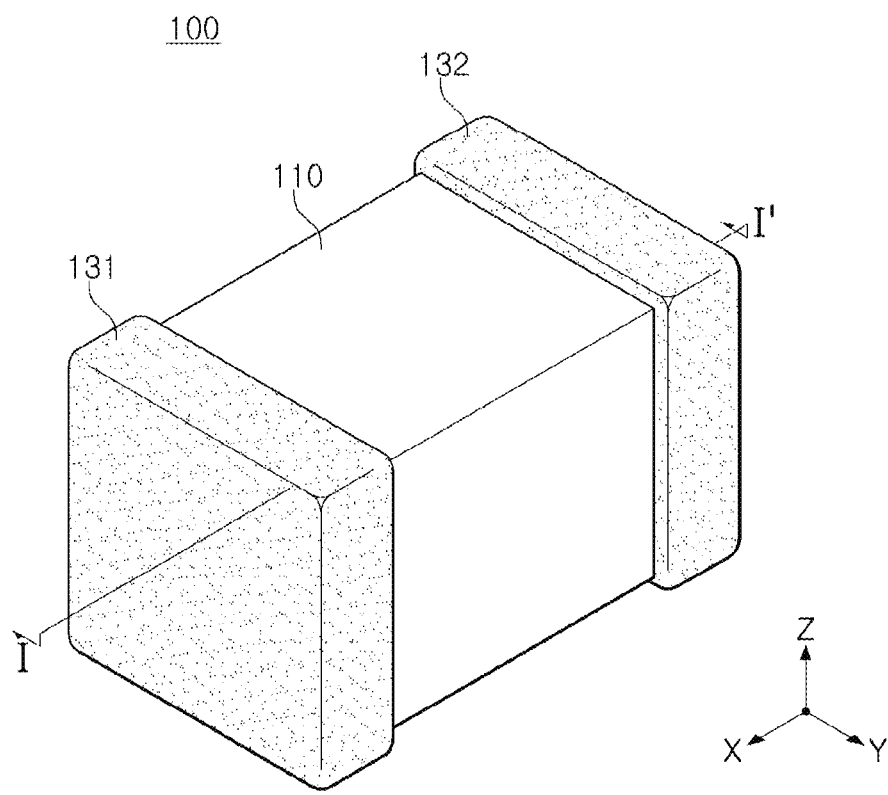
FIG. 1 is a schematic perspective view illustrating a multilayer ceramic electronic component according to an exemplary embodiment in the present disclosure.

Hereinafter, exemplary embodiments of the present disclosure will now be described in detail with reference to the accompanying drawings.

In the drawings, an X direction refers to a first direction, an L direction, or a length direction, a Y direction refers to a second direction, a W direction, or a width direction, and a Z direction refers to a third direction, a T direction, or a thickness direction.

Figure 2:
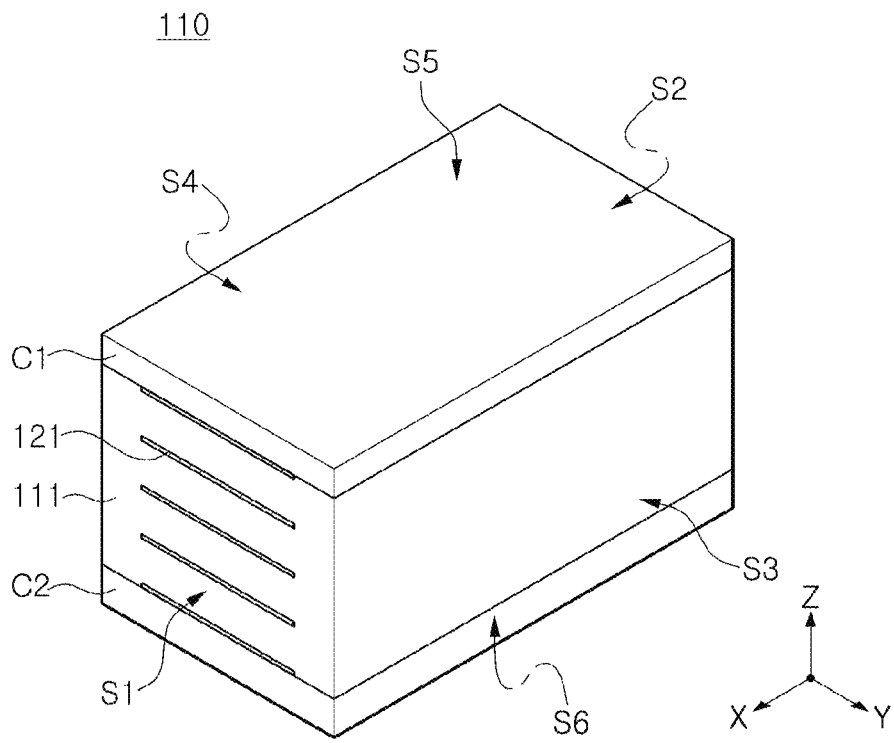
FIG. 2 is a schematic perspective view illustrating a ceramic body of FIG. 1.
Figure 3:
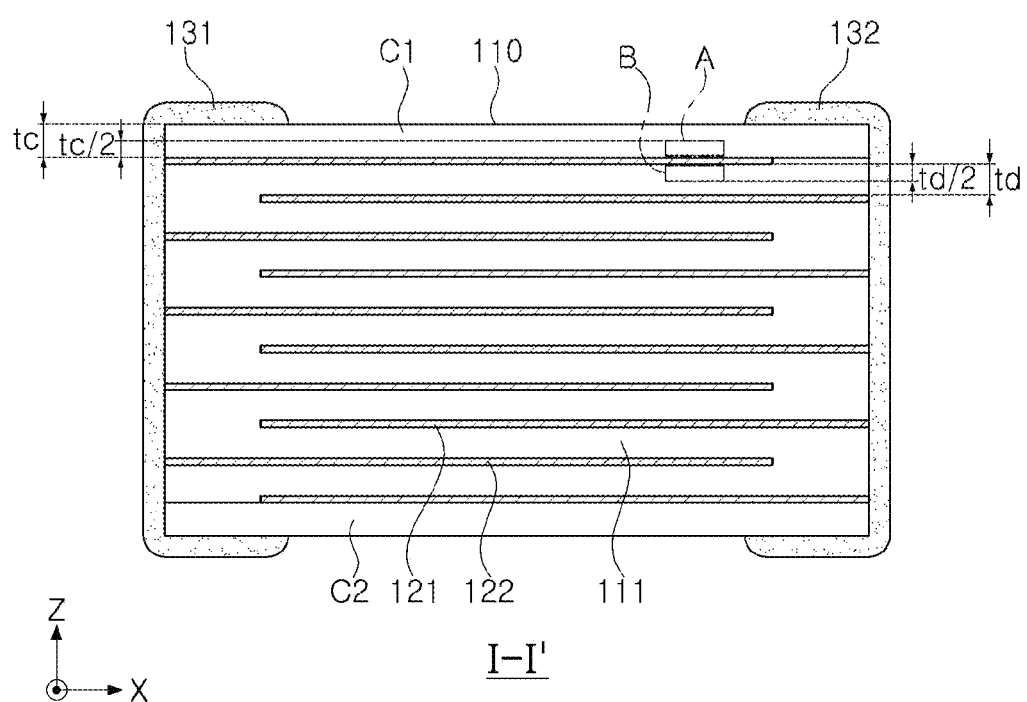
FIG. 3 is a cross-sectional view taken along line I-I' of FIG. 1.

FIG. 1 is a schematic perspective view illustrating a multilayer ceramic electronic component according to an exemplary embodiment in the present disclosure, FIG. 2 is a perspective view illustrating a ceramic body of the multilayer ceramic electronic component, and FIG. 3 is a cross-sectional view taken along line I-I' of FIG. 1.

Hereinafter, a multilayer ceramic electronic component according to an exemplary embodiment in the present disclosure will be described in detail with reference to FIGS. 1 through 3.

Referring to FIGS. 1 through 3, the multilayer ceramic electronic component 100 according to the exemplary embodiment in the present disclosure may include a ceramic body 110 including an active portion having dielectric layers 111 and first and second internal electrodes 121 and 122 alternately stacked with each of the dielectric layers 111 interposed therebetween and first and second cover portions c1 and c2 disposed on opposite surfaces of the active portion in a stacking direction, respectively; and a first external electrode 131 connected to the first internal electrodes 121 and a second external electrode 132 connected to the second internal electrodes 122.

In this case, when a region of the cover portion c1 or c2 in contact with the first or second internal electrode 121 or 122 is an inner region A of the cover portion, and a region of the active portion in contact with the inner region of the cover portion c1 or c2 is an outer region B of the active portion, $1.00 < X_A/X_B \leq 1.04$ in which $X_A/X_B$ is a ratio of a molar ratio ($X_A$) of barium (Ba) to titanium (Ti) in the inner region of the cover portion to a molar ratio ($X_B$) of barium (Ba) to titanium (Ti) in the outer region of the active portion.

In the present specification, the inner region A of the cover portion may refer to a region of the cover portion in contact with the outermost first internal electrode 121 and/or second internal electrode 122 of the first internal electrodes 121 and/or the second internal electrodes 122. More specifically, referring to FIG. 3, the inner region A of the cover portion may refer to a region within a distance of ½×tc from the outermost first internal electrode 121 and/or second internal electrode 122 in which tc is an average thickness of the entire cover portion. The average thickness tc of the cover portion may refer to an average value of thicknesses in the third direction measured at any five spots where the first cover portion c1 and/or the second cover portion c2 are in contact with the first internal electrode 121 and/or the second internal electrode 122.

In addition, in the present specification, the outer region B of the active portion may refer to a region of the active portion disposed in contact with the inner region A of the cover portion. More specifically, referring to FIG. 3, the outer region B of the active portion may refer to a region within a distance of ½×td from the outermost first internal electrode 121 and/or second internal electrode 122 in which td is an average thickness of a dielectric layer positioned at the outermost portion in the active portion. The average thickness td of the dielectric layer positioned at the outermost portion in the active portion may refer to an average value of thicknesses in the third direction measured at any five spots in contact with the first internal electrode 121 and/or the second internal electrode 122 disposed in contact with the first cover portion c1 and/or the second cover portion c2.

Figure 7:
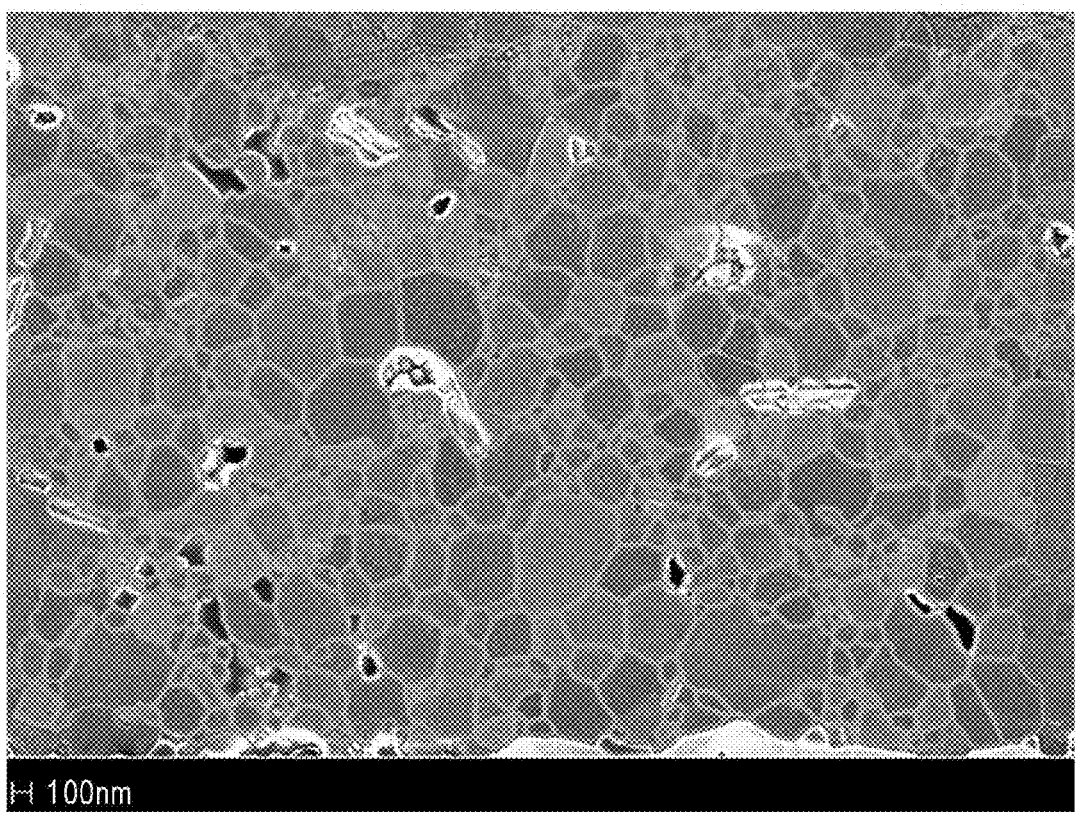
FIG. 7 is an image, captured by a SEM, of a cross section of an inner region of a cover portion of a multilayer ceramic electronic component according to Comparative Example.
Figure 8:
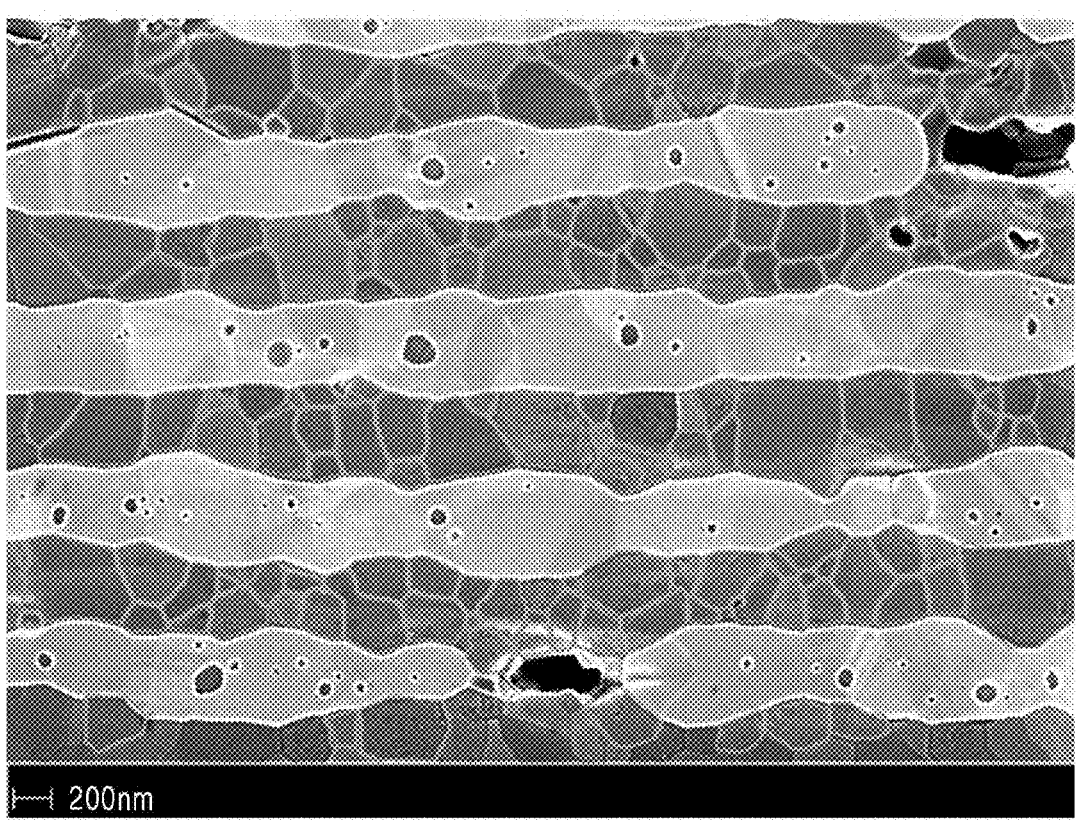
FIG. 8 is an image, captured by a SEM, of a cross section of an outer region of an active portion of the multilayer ceramic electronic component according to Comparative Example.

Components and/or compositions of raw materials of the inner region A of the cover portion and the outer region B of the active portion in a process of manufacturing the multilayer ceramic electronic component may be different from each other. However, diffusion between the materials may occur in a process of sintering the active portion and the cover portion after attaching the active portion and the cover portion to each other, and an influence of the diffusion between the materials may be the largest in the inner region of the cover portion and the outer region of the active portion. FIGS. 7 and 8 are images, captured by a scanning electron microscope (SEM), of cross sections of an inner region of a cover portion and an outer region of an active portion of a multilayer ceramic electronic component according to Comparative Example. Referring to FIGS. 7 and 8, it may be confirmed with the naked eye that crystal grains of a component of the dielectric layers included in the inner region of the cover portion and the outer region of the active portion have various sizes. This phenomenon may occur because intended compositions of the cover portion and the active portion are changed due to materials diffused between the cover portion and the active portion when compositions of the cover portion and the active portion are different from each other, and may be due to an influence of excessive grain growth and/or grain growth suppression of the crystal grains of a component of the dielectric layers. When a dispersion of sizes of the crystal grains becomes wide as in the Comparative Example, an electric field may be concentrated on a portion in which a thickness of a grain boundary is relatively low, and thus, withstand voltage characteristics may be deteriorated.

The ratio ($X_A/X_B$) of the molar ratio ($X_A$) of barium (Ba) to titanium (Ti) in the inner region of the cover portion to the molar ratio ($X_B$) of barium (Ba) to titanium (Ti) in the outer region of the active portion of the multilayer ceramic electronic component according to the present exemplary embodiment may be 1.040 or less, 1.035 or less, 1.030 or less, 1.025 or less, or 1.020 or less, and a lower limit of the ratio ($X_A/X_B$) may exceed 1.00. In the multilayer ceramic electronic component according to the present disclosure, the ratio ($X_A/X_B$) of the molar ratio ($X_A$) of barium (Ba) to titanium (Ti) in the inner region of the cover portion to the molar ratio ($X_B$) of barium (Ba) to titanium (Ti) in the outer region of the active portion may be adjusted in the range described above to adjust sizes of the crystal grains in the inner region A of the cover portion and the outer region B of the active portion in a constant range and reduce a dispersion of the sizes of the crystal grains, thereby improving withstand voltage characteristics.

The ceramic body 110 of the multilayer ceramic electronic component 100 according to the present disclosure may include the active portion including the dielectric layers 111 and the first and second internal electrodes 121 and 122 disposed to be stacked in the third direction (Z direction) with each of the dielectric layers 111 interposed therebetween and the first and second cover portions disposed on the opposite surfaces of the active portion in the stacking direction, respectively.

A shape of the ceramic body 110 is not particularly limited, but may be a hexahedral shape or a shape similar to a hexahedral shape, as illustrated. Although the ceramic body 110 does not have a hexahedral shape having perfectly straight lines due to shrinkage of ceramic powders included in the ceramic body 110 in a sintering process, the ceramic body 110 may have substantially the hexahedral shape. The ceramic body 110 may be subjected to round treatment so that edges thereof are not angulate, if necessary. The round treatment may be, for example, barrel polishing or the like, but is not limited thereto.

The dielectric layers 111, the first internal electrodes 121, and the second internal electrodes 122 may be alternately stacked in the active portion of the ceramic body 110. The dielectric layers 111, the first internal electrodes 121, and the second internal electrodes 122 may be stacked in the third direction (Z direction). The plurality of dielectric layers 111 may be in a sintered state, and adjacent dielectric layers 111 may be integrated with each other so that boundaries therebetween are not readily apparent without using a scanning electron microscope (SEM).

According to the exemplary embodiment in the present disclosure, the dielectric layer 111 may include a main component represented by $(Ba_{1-x}Ca_x)(Ti_{1-y}(Zr, Sn, Hf)_y)O_3$ (here, $0 \leq x \leq 1$ and $0 \leq y \leq 0.5$). The main component may be, for example, a compound in which Ca, Zr, Sn, and/or Hf are partially dissolved in $BaTiO_3$. In the above composition formula, x may be in the range of 0 or more and 1 or less, and y may be in the range of 0 or more and 0.5 or less, but is not limited thereto. For example, when x is 0, and y is 0 in the above composition formula, a main component may be $BaTiO_3$. In addition, various ceramic additives, organic solvents, plasticizers, binders, dispersants, and the like, may be added to the component according to an object of the present disclosure.

The dielectric layers 111 may be formed by adding an additive as necessary to slurry including the material described above and applying and then drying the slurry to carrier films to prepare a plurality of ceramic sheets. The ceramic sheets may be formed by manufacturing the slurry in a sheet shape having a thickness of several micrometers by a doctor blade method, but are not limited thereto.

Figure 6:
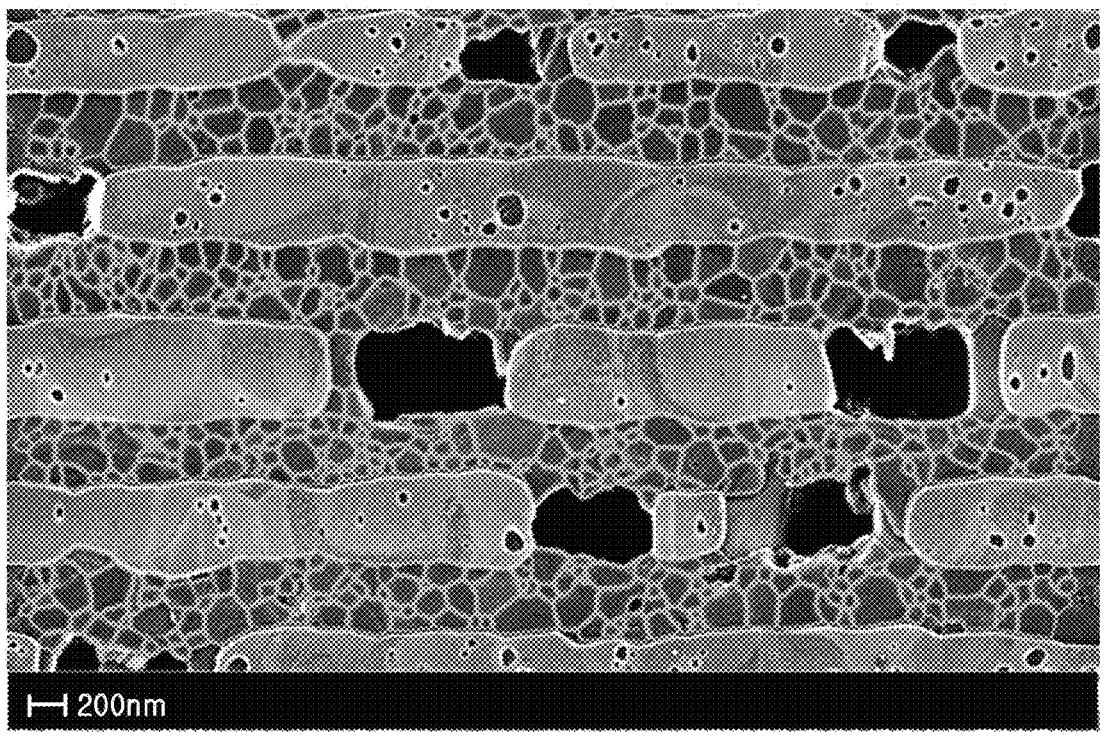
FIG. 6 is an image, captured by a SEM, of a cross section of an outer region of an active portion of the multilayer ceramic electronic component according to Inventive Example.

In the exemplary embodiment in the present disclosure, the outer region of the active portion of the multilayer ceramic electronic component may include crystal grains and grain boundaries disposed between two or more crystal grains. The crystal grains may be divided by the grain boundaries. FIG. 6 is an image, captured by a SEM, of a cross section of the outer region of the active portion of the multilayer ceramic electronic component according to the present disclosure. Referring to FIG. 6, it may be confirmed that the outer region of the active portion includes a plurality of crystal grains and grain boundaries are disposed at boundaries between the crystal grains.

In the exemplary embodiment in the present disclosure, an average grain size of the crystal grains included in the outer region of the active portion of the multilayer ceramic electronic component may be in the range of 130 nm or more and 230 nm or less. In the present specification, the "average grain size" may refer to an average value of values measured at any five spots in a cross section of the dielectric layer of the active portion, and may mean a D50 grain size. A measured grain size of the crystal grains may refer to an average value calculated through an image analysis program (Image-Pro Plus ver 4.5 available from Media Cybernetics Inc.) after capturing an image of the cross section of the dielectric layer using a scanning electron microscope (SEM) (JSM-7400F available from Jeol Ltd.).

In a multilayer ceramic electronic component according to the related art, there was a problem that it is difficult to reduce sizes of crystal grains to a predetermined size or less because abnormal grain growth of the crystal grains occurs due to diffusion of an additive material, or the like, as described above. In particular, there was a problem that crystal grains having a relatively large size are formed due to excessive grain growth in the outer region of the active portion as compared with crystal grains of a dielectric layer in a central region of the active portion. FIG. 6 is an image, captured by a SEM, of a cross section of the outer region of the active portion of the multilayer ceramic electronic component according to Inventive Example. Referring to FIG. 6, it may be confirmed with the naked eye that sizes of crystal grains in the outer region of the active portion become smaller than those of FIG. 8. In the multilayer ceramic electronic component according to the present disclosure, the outer region of the active portion may have crystal grains having a size smaller than that in the related art by adjusting components included in the cover portion as described later. Therefore, a concentration of an electric field on a specific position may be solved.

According to the exemplary embodiment in the present disclosure, a dispersion of the grain sizes of the crystal grains included in the outer region of the active portion of the multilayer ceramic electronic component may be in the range of 50 nm or more and 100 nm or less. In the present specification, the "dispersion of the grain sizes of the crystal grains" may refer to a standard deviation of the crystal grains of the dielectric layer included in 1 μm×1 μm regions of any ten spots of the cross section of the multilayer ceramic electronic component calculated on the basis of the average grain size of the crystal grains described above. The dispersion of the grain sizes of the crystal grains may indicate a uniform degree of a dispersion of the grain sizes of the crystal grains, and as a magnitude of the dispersion of the grain sizes of the crystal grains becomes smaller, it may mean that the outer region has crystal grains having more uniform sizes. In the multilayer ceramic electronic component according to the present disclosure, a concentration of an electric field applied to the active portion may be efficiently prevented by adjusting the dispersion of the grain sizes of the crystal grains included in the outer region of the active portion in the range described above. When comparing FIGS. 6 and 8 with each other, it may be confirmed with the naked eye that the sizes of the crystal grains in the outer region of the active portion in FIG. 6 according to Inventive Example are more uniform than those in FIG. 8.

The ceramic body 110 may be formed by alternately stacking ceramic green sheets on which the first internal electrodes 121 are printed and ceramic green sheets on which the second internal electrodes 122 are printed, on the dielectric layers 111 in the third direction (Z direction). A method of printing the first and second internal electrodes may be a screen printing method, a gravure printing method or the like, but is not limited thereto.

The first and second internal electrodes 121 and 122 may be stacked so that end surfaces thereof are exposed, respectively, to opposite portions of the ceramic body 110 opposing each other. Specifically, the first and second internal electrodes 121 and 122 may be exposed to opposite surfaces of the ceramic body 110 in the first direction (X direction), respectively, the first internal electrodes 121 may be exposed to a first surface S1 of the ceramic body 110, and the second internal electrodes 122 may be exposed to a second surface S2 of the ceramic body 110.

The first and second internal electrodes 121 and 122 may include a conductive metal. The conductive metal may include one or more of, for example, silver (Ag), nickel (Ni), copper (Cu), tin (Sn), palladium (Pd), platinum (Pt), iron (Fe), gold (Au), silver (Ag), tungsten (W), titanium (Ti), lead (Pb), or alloys thereof. The first and second internal electrodes 121 and 122 may be formed using a conductive paste including the conductive metal.

The ceramic body of the multilayer ceramic electronic component according to the present disclosure may include the cover portions on opposite surfaces thereof in the stacking direction. The cover portions may be attached to the opposite surfaces of the active portion in the third direction (Z direction), respectively, and may include the first cover portion and the second cover portion. The first and second cover portions may be formed by stacking one or more dielectric layers that do not include internal electrodes on the uppermost internal electrode of the ceramic body 110 and beneath the lowermost internal electrode of the ceramic body 110, respectively. The cover portions may basically serve to prevent damage to the internal electrodes due to physical or chemical stress.

In the exemplary embodiment in the present disclosure, the first and second cover portions of the multilayer ceramic electronic component may include a main component represented by $(Ba_{1-x}Ca_x)(Ti_{1-y}(Zr, Sn, Hf)_y)O_3$ (here, $0 \leq x \leq 1$ and $0 \leq y \leq 0.5$). The main component may be, for example, a compound in which Ca, Zr, Sn, and/or Hf are partially dissolved in $BaTiO_3$. In the above composition formula, x may be in the range of 0 or more and 1 or less, and y may be in the range of 0 or more and 0.5 or less, but is not limited thereto. For example, when x is 0, and y is 0, in the above composition formula, a main component may be $BaTiO_3$. In addition, various ceramic additives, organic solvents, plasticizers, binders, dispersants, and the like, may be added to the main component according to an object of the present disclosure.

According to the exemplary embodiment in the present disclosure, the first and second cover portions may include barium (Ba) as an accessory component. The barium (Ba) may be injected in a form of carbonate, oxide, and/or glass of a Ba element in a raw material stage, but may be included in a form of oxide and/or glass in the dielectric layer after being subjected to a sintering process. The barium (Ba) may perform a function of adjusting a ratio of element contents of an A site and a B site of the main component and a function of a sintering aid, but when an excessive amount of barium (Ba) is included in a raw material, the barium (Ba) may form a liquid phase in the sintering process to be rapidly diffused, and it may thus be difficult to perform control so that the cover portion includes the barium (Ba) in an intended content range after the sintering process. In the multilayer ceramic electronic component according to the present disclosure, an intended content ratio of Ba to Ti may be implemented by adjusting a point in time when the barium (Ba) is injected as described later.

In the exemplary embodiment in the present disclosure, a molar ratio of barium (Ba) in the inner regions of the first and second cover portions of the multilayer ceramic electronic component to titanium (Ti) in the inner regions of the first and second cover portions may be 1.020 or more and 1.040 or less. When a content of barium (Ba) in the inner regions of the first and second cover portions of the multilayer ceramic electronic component according to the present disclosure is in the range described above, the molar ratio of Ba/Ti in the inner region of the cover portion to the molar ratio of Ba/Ti in the outer region of the active portion may be in the range described above.

Figure 5:
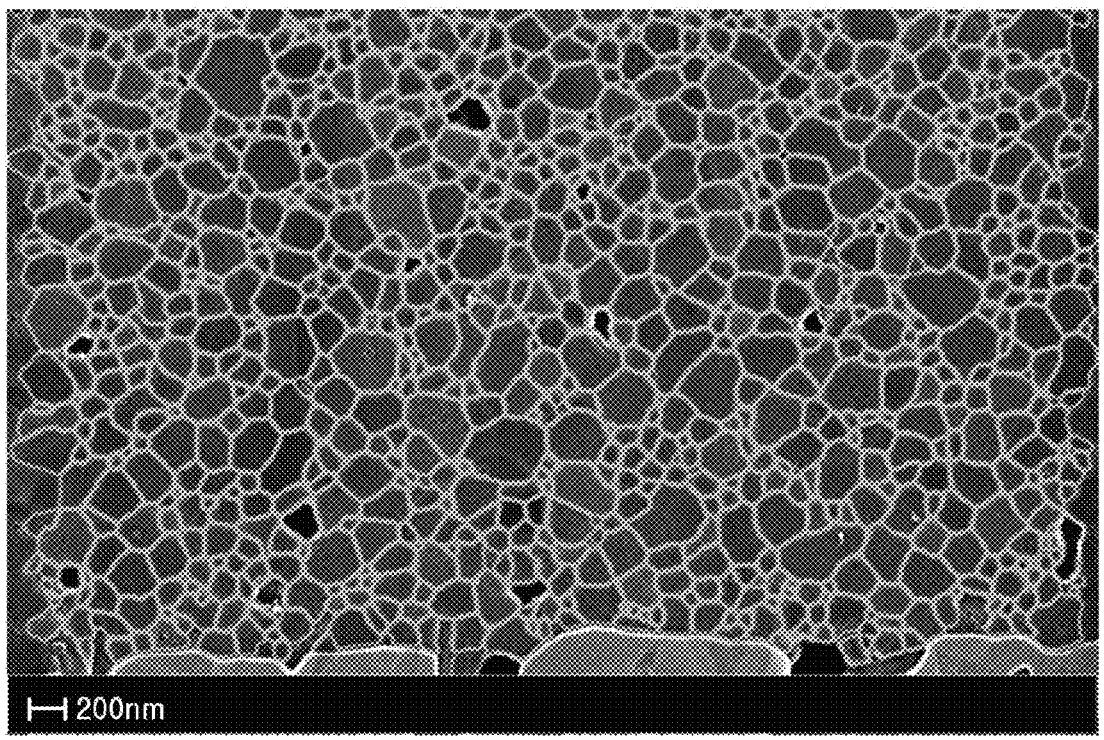
FIG. 5 is an image, captured by a scanning electron microscope (SEM), of a cross section of an inner region of a cover portion of a multilayer ceramic electronic component according to Inventive Example.

In the exemplary embodiment in the present disclosure, the inner region of the cover portion of the multilayer ceramic electronic component may include crystal grains and grain boundaries disposed between two or more crystal grains. The crystal grains may be divided by the grain boundaries. FIG. 5 is an image, captured by a SEM, of a cross section of the outer region of the active portion of the multilayer ceramic electronic component according to the present disclosure. Referring to FIG. 5, it may be confirmed that the inner region of the cover portion includes a plurality of crystal grains and grain boundaries are disposed at boundaries between the crystal grains.

In the exemplary embodiment in the present disclosure, an average grain size of the crystal grains included in the inner region of the cover portion of the multilayer ceramic electronic component may be in the range of 140 nm or more and 200 nm or less. FIG. 5 is an image, captured by a SEM, of a cross section of the inner region of the cover portion of the multilayer ceramic electronic component according to Inventive Example. Referring to FIG. 5, it may be confirmed with the naked eye that sizes of crystal grains in the inner region of the cover portion become smaller than those of FIG. 7 according to Comparative Example. In the multilayer ceramic electronic component according to the present disclosure, the inner region of the cover portion may have crystal grains having a size smaller than that in the related art by adjusting components included in the cover portion as described later. Therefore, a concentration of an electric field on a specific position may be solved.

According to the exemplary embodiment in the present disclosure, a dispersion of the grain sizes of the crystal grains included in the inner region of the cover portion of the multilayer ceramic electronic component may be in the range of 50 nm or more and 80 nm or less. When comparing FIGS. 5 and 7 with each other, it may be confirmed with the naked eye that the sizes of the crystal grains in the inner region of the cover portion in FIG. 5 according to Inventive Example are more uniform than those in FIG. 7 according to Comparative Example. In the multilayer ceramic electronic component according to the present disclosure, an influence of the dispersion of the grain sizes of the crystal grains included in the inner region of the cover portion on the crystal grains in the outer region of the active portion adjacent to the cover portion may be significantly reduced by adjusting the dispersion of the grain sizes of the crystal grains included in the inner region of the cover portion in the range described above. As a result, a concentration of an electric field applied to the outer region of the active portion may be efficiently prevented.

In the exemplary embodiment in the present disclosure, an average grain size of the crystal grains in the inner region of the cover portion of the multilayer ceramic electronic component may be greater than or equal to an average grain size of the crystal grains in the outer region of the active portion. Specifically, the average grain size of the crystal grains in the outer region of the active portion may be 0.6 times or more and 1.0 times or less the average grain size of the crystal grains in the inner region of the cover portion. When the average grain size of the crystal grains in the outer region of the active portion of the multilayer ceramic electronic component according to the present disclosure is in the range described above, the cover portion may have an excellent mechanical strength and moisture resistance reliability, and reliability of the multilayer ceramic electronic component according to the present disclosure may thus be improved.

In the multilayer ceramic electronic component according to the present disclosure, the first external electrode 131 and the second external electrode 132 may be disposed on opposite surfaces of the ceramic body in the first direction (X direction), respectively. The first external electrode 131 may be connected to the first internal electrodes 121, and the second external electrode 132 may be connected to the second internal electrodes 122. The first external electrode 131 may be disposed on the first surface S1 of the ceramic body 110, and the second external electrode 132 may be disposed on the second surface S2 of the ceramic body 110.

In the exemplary embodiment in the present disclosure, each of the first external electrode 131 and the second external electrode 132 of the multilayer ceramic electronic component may include a conductive metal and a glass component. The conductive metal may include one or more of, for example, copper (Cu), nickel (Ni), tin (Sn), palladium (Pd), platinum (Pt), gold (Au), silver (Ag), tungsten (W), titanium (Ti), lead (Pb), or alloys thereof.

The glass component included in each of the first external electrode 131 and the second external electrode 132 may be a composition in which oxides are mixed with each other, and may include one or more selected from the group consisting of silicon oxide, boron oxide, aluminum oxide, transition metal oxide, alkali metal oxide, and alkaline earth metal oxide, but is not particularly limited thereto. A transition metal may be selected from the group consisting of zinc (Zn), titanium (Ti), copper (Cu), vanadium (V), manganese (Mn), iron (Fe), and nickel (Ni), an alkali metal may be selected from the group consisting of lithium (Li), sodium (Na) and potassium (K), and an alkaline earth metal may be at least one selected from the group consisting of magnesium (Mg), calcium (Ca), strontium (Sr), and barium (Ba).

A method of forming the first external electrode 131 and the second external electrode 132 does not need to be particularly limited. For example, the first external electrode 131 and the second external electrode 132 may be formed by dipping the ceramic body in a conductive paste including a conductive metal and a glass or may be formed by printing the conductive paste on surfaces of the ceramic body by a screen printing method, a gravure printing method or the like. In addition, the conductive paste may be applied to the surfaces of the ceramic body or a dry film obtained by drying the conductive paste may be transferred onto the ceramic body, but is not limited thereto. Permeation of a plating solution and/or external moisture may be effectively suppressed by increasing a compactness of the external electrodes due to the added glass while maintaining sufficient conductively by forming the first external electrode 131 and the second external electrode 132 using the conductive paste described above.

Experimental Example

A ceramic slurry was prepared using barium titanate powders having an average grain size of 50 nm. Ethanol, toluene, dispersants, binders, additives, and the like, were added to and mixed with the barium titanate powders to prepare a ceramic slurry. A sheet for forming a cover portion was prepared using the prepared ceramic slurry. Prototype chips according to Inventive Example in which cover portions are formed by attaching the manufactured ceramic sheets to tops and bottoms of mass-produced chips (temperature characteristics: X7R and capacitance: 220.0 nF) of a 1005 size (length×width: 1.0 mm×0.5 mm) including external electrodes formed on surfaces of a ceramic body in a length direction and available from Samsung Electro-Mechanics were manufactured.

In Comparative Example, prototype chips were manufactured under the same condition as that of Inventive Example except that cover portions were manufactured using a dielectric layer used in an active portion. A withstand voltage test, a Step IR test, and a thin layer standard test were performed on the manufactured prototype chips.

The step IR test was started at 4V at 150° C. and was performed for a total of 8 hours while increasing a voltage by 2V every 2 hours. The thin layer standard test was performed under a condition of 105° C. and 6V for 24 hours.

Figure 4:
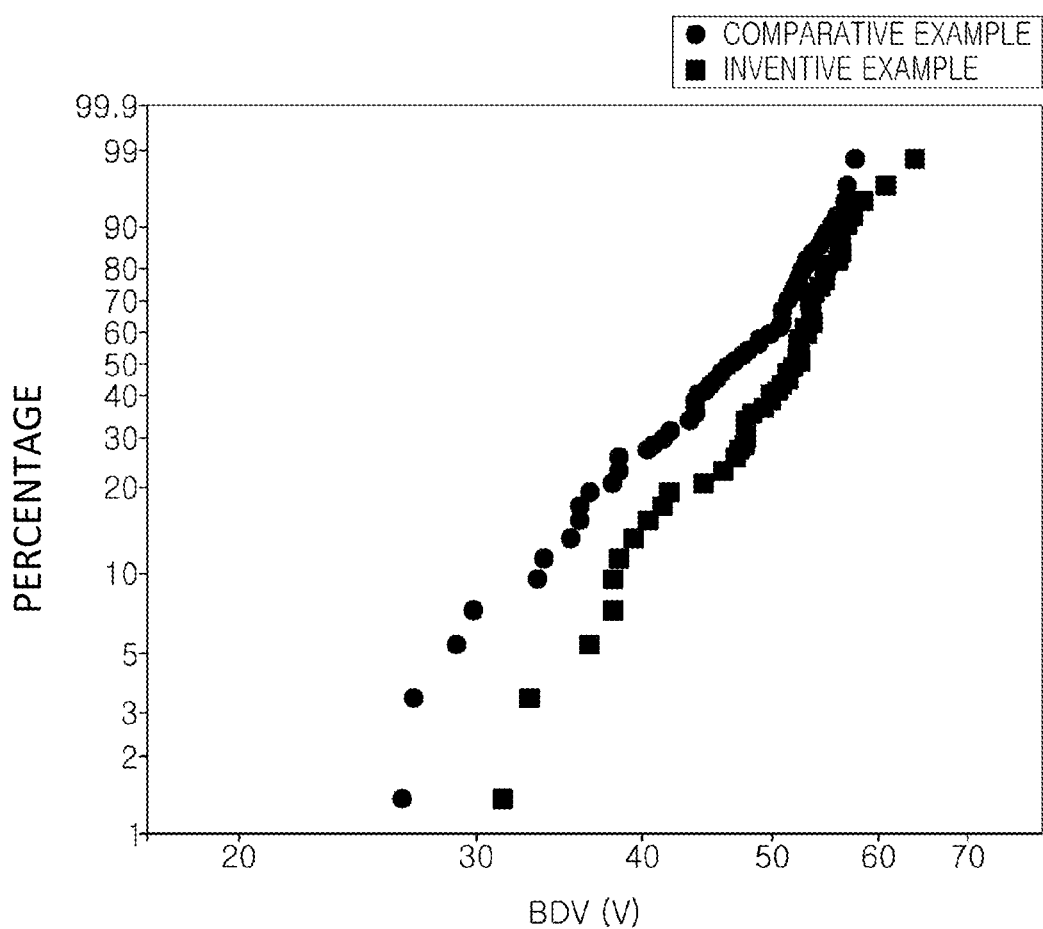
FIG. 4 is graphs illustrating measured values of dielectric breakdown voltages (BDVs) of multilayer ceramic electronic components according to Inventive Example and Comparative Example.

FIG. 4 is graphs illustrating measured values of dielectric breakdown voltages of chips manufactured in Inventive Example and Comparative Example. Referring to FIG. 4, it may be confirmed that the prototype chips according to Inventive Example have dielectric breakdown voltages (BVDs) higher than those of the prototype chips according to Comparative Example under the same withstand voltage measurement condition. This may be interpreted as a result obtained by dispersing an influence on the same voltage by suppressing a concentration of an electric field on a predetermined portion in Inventive Example as compared with Comparative Example.

Figure 9A:
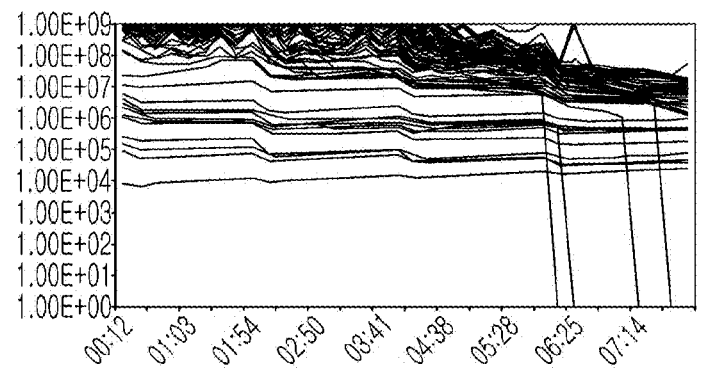
FIG. 9A is graphs illustrating Step insulation resistance (IR) test results for prototype samples according to Comparative Example.
Figure 9B:
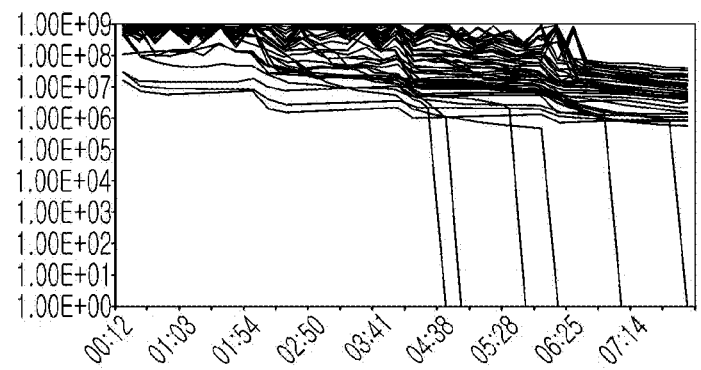
FIG. 9B is graphs illustrating Step IR test results for prototype samples according to Inventive Example.

FIG. 9A is graphs illustrating Step IR test results for the prototype samples according to Comparative Example, and FIG. 9B is graphs illustrating Step IR test results for the prototype samples according to Inventive Example. Referring to FIGS. 9A and 9B, it may be confirmed that excellent results are obtained in the prototype chips according to Inventive Example in that IR order reduction widths of the prototype chips according to Inventive Example are smaller than those of the prototype chips according to Comparative Example.

Figure 10A:
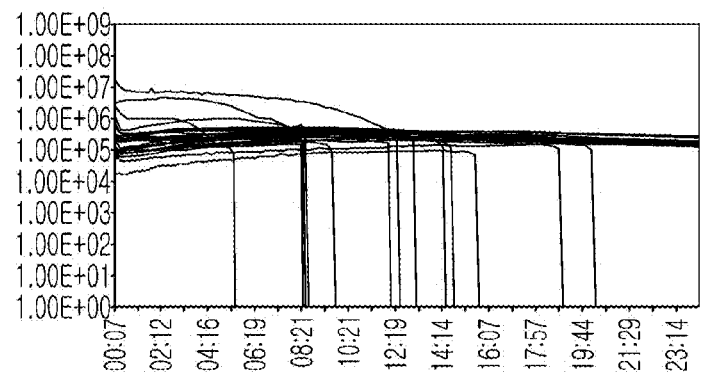
FIG. 10A is graphs illustrating thin layer standard test results for prototype samples according to Comparative Example.
Figure 10B:
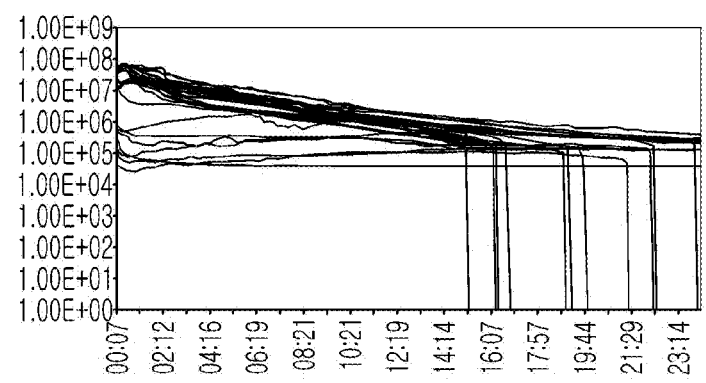
FIG. 10B is graphs illustrating thin layer standard test results for prototype samples according to Inventive Example.

FIG. 10A is graphs illustrating thin layer standard test results for prototype samples according to Comparative Example, and FIG. 10B is graphs illustrating thin layer standard test results for prototype samples according to Inventive Example. Referring to FIGS. 10A and 10B, it may be confirmed that excellent results are obtained in the prototype chips according to Inventive Example in that the numbers of initial IR failures of the prototype chips according to Inventive Example are smaller than those of the prototype chips according to Comparative Example.

As set forth above, according to the exemplary embodiment in the present disclosure, the sizes and the size dispersion of the crystal grains of the multilayer ceramic electronic component may be constantly adjusted.

In addition, the withstand voltage characteristics of the multilayer ceramic electronic component may be improved.

Further, the insulation resistance characteristics of the multilayer ceramic electronic component may be improved.

While exemplary embodiments have been shown and described above, it will be apparent to those skilled in the art that modifications and variations could be made without departing from the scope of the present invention as defined by the appended claims.

What is claimed is:

1. A multilayer ceramic electronic component comprising:
a ceramic body including an active portion having dielectric layers and first and second internal electrodes alternately stacked with each of the dielectric layers interposed therebetween and first and second cover portions disposed on opposite surfaces of the active portion in a stacking direction, respectively; and
a first external electrode connected to the first internal electrodes and a second external electrode connected to the second internal electrodes,
wherein when a region of the cover portion in contact with the first or second internal electrode is an inner region of the cover portion, and a region of the active portion in contact with the inner region of the cover portion is an outer region of the active portion, $1.00 < X_A/X_B \leq 1.04$ in which $X_A/X_B$ is a ratio of a molar ratio ($X_A$) of barium (Ba) to titanium (Ti) in the inner region of the cover portion to a molar ratio ($X_B$) of barium (Ba) to titanium (Ti) in the outer region of the active portion.

2. The multilayer ceramic electronic component of claim 1, wherein the inner region of the cover portion includes crystal grains of a component of the dielectric layers, and an average grain size of the crystal grains in the inner region of the cover portion is in a range of 140 nm or more and 200 nm or less.

3. The multilayer ceramic electronic component of claim 2, wherein a dispersion of grain sizes of the crystal grains in the inner region of the cover portion is in a range of 50 nm or more and 80 nm or less.

4. The multilayer ceramic electronic component of claim 1, wherein the outer region of the active portion includes crystal grains of a component of the dielectric layers, and an average grain size of the crystal grains in the outer region of the active portion is in a range of 130 nm or more and 230 nm or less.

5. The multilayer ceramic electronic component of claim 4, wherein a dispersion of grain sizes of the crystal grains in the outer region of the active portion is in a range of 50 nm or more and 100 nm or less.

6. The multilayer ceramic electronic component of claim 1, wherein the inner region of the cover portion and the outer region of the active portion include crystal grains of a component of the dielectric layers, and an average grain size of the crystal grains in the inner region of the cover portion is greater than or equal to that of the crystal grains in the outer region of the active portion.

7. The multilayer ceramic electronic component of claim 6, wherein the average grain size of the crystal grains in the outer region of the active portion is 0.6 times or more and 1.0 times or less the average grain size of the crystal grains in the inner region of the cover portion.

8. The multilayer ceramic electronic component of claim 1, wherein the inner region of the cover portion includes a main component represented by $(Ba_{1-x}Ca_x)(Ti_{1-y}(Zr, Sn, Hf)_y)O_3$ (here, $0 \leq x \leq 1$ and $0 \leq y \leq 0.5$) and an accessory component including barium (Ba).

9. The multilayer ceramic electronic component of claim 8, wherein a molar ratio of barium (Ba) in the inner region of the cover portion to titanium (Ti) in the inner region of the cover portion is in a range of 1.020 or more and 1.040 or less.

10. The multilayer ceramic electronic component of claim 1, wherein the first and second internal electrodes include one or more conductive metals selected from the group consisting of silver (Ag), palladium (Pd), gold (Au), platinum (Pt), nickel (Ni), copper (Cu), tin (Sn), tungsten (W), titanium (Ti), and alloys thereof.

11. The multilayer ceramic electronic component of claim 1, wherein $X_A/X_B$ is 1.035 or less.

12. The multilayer ceramic electronic component of claim 1, wherein $X_A/X_B$ is 1.030 or less.

13. The multilayer ceramic electronic component of claim 1, wherein $X_A/X_B$ is 1.025 or less.

14. The multilayer ceramic electronic component of claim 1, wherein $X_A/X_B$ is 1.020 or less.

* * * * *